United States Patent [19]

Schotz

[11] Patent Number: 4,750,206
[45] Date of Patent: * Jun. 7, 1988

[54] ADAPTER FOR TV STEREO, SAP AND AUXILIARY SIGNALS

[75] Inventor: Larry Schotz, Cedarburg, Wis.

[73] Assignee: Recoton Corporation, Long Island City, N.Y.

[*] Notice: The portion of the term of this patent subsequent to Dec. 30, 2003 has been disclaimed.

[21] Appl. No.: 923,978

[22] Filed: Oct. 28, 1986

[51] Int. Cl.⁴ .............................................. H04H 5/00
[52] U.S. Cl. ........................................ 381/4; 358/144; 455/41
[58] Field of Search .................. 455/20, 21, 41; 381/2, 381/3, 4; 358/144, 198; 381/104, 106, 107, 109

[56] References Cited

U.S. PATENT DOCUMENTS

| | | | |
|---|---|---|---|
| 4,021,737 | 5/1977 | Trask | 358/189 |
| 4,272,788 | 6/1981 | Ogita | 358/189 |
| 4,302,837 | 11/1981 | Tanaka et al. | 381/2 |
| 4,555,730 | 11/1985 | Briggs | 358/142 |
| 4,633,495 | 12/1986 | Schotz | 381/3 |
| 4,644,580 | 2/1987 | Akabane | 381/4 |
| 4,646,150 | 2/1987 | Robbins et al. | 381/2 |

FOREIGN PATENT DOCUMENTS

| | | |
|---|---|---|
| 1196522 | 6/1970 | United Kingdom . |
| 1411803 | 10/1975 | United Kingdom . |
| 1473640 | 5/1977 | United Kingdom . |
| 1482986 | 8/1977 | United Kingdom . |
| 1555257 | 11/1979 | United Kingdom . |
| 2138642 | 10/1984 | United Kingdom . |
| 2138657 | 10/1984 | United Kingdom . |

Primary Examiner—Forester W. Isen
Attorney, Agent, or Firm—Curtis, Morris & Safford

[57] ABSTRACT

An adapter is provided for use with a television receiver to detect and decode stereophonic audio signals, SAP signals or auxiliary signals that may be transmitted with the composite television signals. The adapter includes an IF input that is physically separate from the television receiver for receiving IF audio signals that normally are derived from the transmitted composite telephone signals. Detecting circuitry is coupled to the IF input by means of a tuned circuit that is tuned to the IF carrier frequency of the received IF audio signals for detecting the stereo, SAP or auxiliary signals transmitted with the composite television signals. The detected signals are used to drive utilization means, such as loudspeakers. Preferably, switches are provided to select the stereo or SAP or auxiliary signals for detection.

18 Claims, 2 Drawing Sheets

ADAPTER FOR TV STEREO, SAP AND AUXILIARY SIGNALS

This invention is a continuation-in-part of copending application Ser. No. 758,042, filed July 23, 1985, now U.S. Pat. No. 4,633,495.

BACKGROUND OF THE INVENTION

This invention relates to an adapter for use with, but physically separate from a conventional television receiver to detect and decode stereophonic, SAP or auxiliary signals that may be transmitted with a composite television signal but which are not otherwise detectable by the television receiver. Advantageously, no physical or electrical (i.e. no wired) connections to the television receiver are needed for the successful operation of the adapter. Optionally, however, enhanced results may be attained by connecting the adapter to the usual multiplex output (or MPX) jack of the television receiver.

Recently, the transmission of stereophonic audio signals for television broadcasting has been approved. The format for such stereophonic audio broadcasting is the so-called Zenith system described in, for example, Audio Magazine, June 1984, pages 47–51, and also in Engineering Report GL-84091, National Semiconductor, September 1984, "A Stereo TV Decoder for Zenith System". As described in the aforementioned publications, the Zenith system of stereophonic audio broadcasting includes a monophonic (L+R) component whose base band ranges from 0 to 15 KHz, this monophonic component being frequency modulated onto the usual audio (or sound) frequency carrier $f_S$ that normally accompanies composite television signals, as is conventional, a stereophonic (L−R) component that is amplitude modulated onto a subcarrier of frequency $2f_H$ (wherein $f_H$ is the usual horizontal synchronizing frequency of 15.734 KHz), the amplitude modulated stereo component being of the double sideband suppressed carrier type, a pilot signal of frequency $f_H$, a so-called "second audio program", referred to by those of ordinary skill in the art as SAP, frequency modulated onto a subcarrier whose frequency is $5f_H$, and an auxiliary channel, referred to as a professional channel in which voice or data information may be transmitted, this auxiliary channel being frequency modulated onto a subcarrier of frequency 6.5 $f_H$. The monophonic component, the amplitude modulated double sideband suppressed carrier stereophonic component, the pilot signal, the second audio program and the auxiliary channel all frequency modulate the usual audio carrier $f_S$. Since there is substantially no change in the monophonic (L+R) component, and since this monophonic component serves to frequency modulate the usual audio carrier $f_S$, conventional television receivers that are not equipped to detect or decode the multiplexed stereo signals nevertheless can detect and demodulate the monophonic (L+R) component in the conventional manner. However, those television receivers that are equipped with a stereo detector/decoder compatible with the Zenith system will detect not only the monophonic (L+R) component but also the stereophonic (L−R) component and, by conventional matrix decoding, derive from the monophonic and stereophonic components separate left-channel (L) and right-channel (R) audio signals. Hence, separate left-channel and right-channel loudspeakers may be driven to reproduce stereophonic sounds.

The aforementioned stereo-equipped television receivers also may detect and decode the second audio program (SAP) which, typically, may provide bi-lingual (or translational) information associated with the broadcasted television program. It also is contemplated that the information transmitted in the auxiliary channel will be detected and utilized either by the television receiver or by other means connected to the television receiver and supplied with the detected information.

To improve and enhance the signal-to-noise ratio of the stereophonic (L−R) component, and also the SAP component, a noise reduction companding system is used. More particularly, the stereophonic and SAP components are subjected to noise reduction compression prior to transmission and to expansion upon reception. The particular noise reduction compression technique that has been adopted for use with the Zenith system is the so-called dbx companding system which has been developed by DBX Inc. of Waltham, Mass. It is, of course, expected that the stereo detector/decoder included in stereo-compatible television receivers will be provided with a noise reduction expansion circuit that is compatible with the dbx compression circuit.

Although the monophonic (L+R) component of the transmitted stereo audio signals still will be detected by conventional television receivers that are not equipped with stereo detectors/decoders, stereophonic sound reproduction, or the sensation (or simulation) of stereophonic sound will not be reproduced. It has been proposed, heretofore, that such conventional television receivers be modified (or retrofitted) in order to detect and reproduce stereophonic sound and also SAP signals from TV stereo transmissions. Alternatively, separate receivers capable of receiving the audio portion of television transmissions, that is, the audio carrier $f_S$, and detecting and decoding the stereo, SAP and auxiliary signals therefrom, would have to be purchased.

The aforementioned proposals of retrofitting conventional television receivers to include a stereo-SAP-auxiliary channel detector/decoder or purchasing special TV sound receivers not only are expensive but, in many instances, will not be preferred by the several million consumers who now own conventional television receivers that are not compatible with stereo TV transmissions. Consequently, it is believed that, once stereo TV transmissions become more prevalent, there will be a need for a relatively simple adapter that can be used without significant modifications to conventional television receivers. Advantageously, such a stereo, SAP, auxiliary channel TV adapter should be physically and electrically independent of the television receiver, thus requiring no internal wiring or soldering which otherwise would be necessary for the adapter to be compatible and usable with the television receiver. In particular, it is desirable to permit the adapter to pick up the received audio portion of the television program without providing a wired circuit connection between the adapter and the conventional components of the television receiver. Furthermore, with the growing number of subscribers to cable and to pay television distribution systems, it also is desirable to provide a simple connection between the adapter and the usual cable television receiver/converter "box".

OBJECTS OF THE INVENTION

Therefore, it is an object of the present invention to provide a TV adapter for use with a television receiver for the purpose of detecting and decoding stereophonic, SAP and auxiliary channel signals that are transmitted with composite television signals without requiring hard-wired interconnections between the adapter and the television receiver.

Another object of this invention is to provide a TV adapter of the aforementioned type having a pick-up for picking up the audio portion of a received television program, the pick-up being physically independent of the television receiver.

A further object of the invention is to provide a TV adapter of the aforementioned type which need not be re-tuned or re-adjusted as the television receiver is tuned from one broadcast channel to another.

Another object of this invention is to provide a TV adapter of the aforementioned type in which the pick-up is an IF pick-up which senses spurious IF audio signals that normally leak from the IF section of conventional television receivers.

A still further object of this invention is to provide a TV adapter of the aforementioned type in which the spurious IF audio signals are picked up and, if a stereophonic component is present, left-channel and right-channel audio signals are decoded from the picked up IF audio signals.

Yet another object of this invention is to provide a TV adapter of the aforementioned type in which the decoded audio signals are subjected to automatic gain control such that the level of these signals is adjusted as a function of the sound volume adjustment control (e. g. the remote sound level control) normally provided with a conventional television receiver.

A still further object of this invention is to provide a TV adapter of the aforementioned type in which the sound level of the decoded audio signals is controlled as a function of the output sound level of the television receiver.

An additional object of this invention is to provide a TV adapter that may be used alternatively with an IF pick-up probe or may be connected by a tuned circuit directly to the usual "TV output" coupling of a conventional "pay TV" receiver "box".

Another object of this invention is to provide a TV adapter that can be used, without requiring soldering or direct circuit connections, with a conventional television receiver for detecting and decoding SAP and/or auxiliary channel signals that may be transmitted with composite television signals.

Various other objects, advantages and features of the present invention will become readily apparent from the ensuing detailed description, and the novel features will be particularly pointed out in the appended claims.

SUMMARY OF THE INVENTION

In accordance with this invention, an adapter is provided for use with a television receiver to detect and decode stereophonic audio signals, SAP signals or auxiliary signals that are transmitted with the composite television signals of a stereo television program. The adapter includes an input that is physically separate from the television receiver for supplying IF audio signals that are derived from the transmitted composite television signals. Detecting circuitry coupled to the input by a tuned circuit that is tuned to the IF carrier frequency detects monophonic and stereophonic components from the supplied IF signals, and also SAP and auxiliary channel signals therefrom. Left-channel and right-channel signals are decoded from the detected stereophonic components, and they or the detected SAP signals are utilized as output signals to drive utilization means, such as loudspeakers, headphones, or the like.

In accordance with one aspect of this invention, the input comprises an IF pick-up probe that is positionable proximate the IF section normally provided in the television receiver. Preferably, this pick-up probe is an inductive probe tuned to the audio IF subcarrier frequency for inducing the flow therein of IF audio signals.

In accordance with another aspect of this invention, the input comprises a simple plug connection to a "pay television" receiver/converter (such as a cable TV "box") that normally is connected to a television receiver, the plug connection supplying the converted television signals received from the receiver/converter to a demodulator which generates the IF audio signals therefrom.

As yet another aspect of this invention, the decoded left-channel and right-channel signals, or the detected SAP signals, are subjected to automatic gain control in response, at least in part, to the output sound level of the television receiver. As one feature, the output sound level of the television receiver is derived from a microphone which picks up the sounds produced by the loudspeaker normally provided in or with the television receiver. Alternatively, the output sound level of the television receiver may be detected by connecting a plug to the usual headphone jack provided with most television receivers. In either embodiment, the signal representing the output sound level of the television receiver is compared to a decoded or detected signal, and the difference between the compared signals is utilized to adjust the gain of the output utilization drive signals. As another feature, the decoded or detected signal to which the sound-representing signal is compared is selectively supplied to the comparator by a switch that is closed when the detected monophonic (L+R) component or the detected SAP signal exceeds a predetermined threshold level and is opened when that signal is less than that threshold level.

In accordance with another aspect of the adapter, the detected stereophonic (L−R) component or SAP signal is subjected to noise reduction expansion compatible with the noise reduction compression applied to the stereophonic component or SAP signal prior to its transmission. The adapter thus is compatible with the noise reduction technique utilized by the broadcaster of the composite television signal.

As another feature of this invention, selector switches are provided to utilize, or reproduce, either the stereophonic sound program or the SAP program transmitted with the composite television signals. In one state, the selector switches couple the decoded left-channel and right-channel signals to the utilization means; and in another state, the detected SAP signals are coupled to the utilization means.

BRIEF DESCRIPTION OF THE DRAWINGS

The following detailed description, given by way of example, and not intended to limit the present invention solely to the embodiments shown and described herein, will best be understood in conjunction with the accompanying drawings in which:

FIG. 3 is a graphical representation of the video and audio transmission spectra; and FIG. 4 is a graphical representation of the stereo spectrum for the audio portion that accompanies the television program.

DETAILED DESCRIPTION OF A CERTAIN PREFERRED EMBODIMENT

Figure 1:
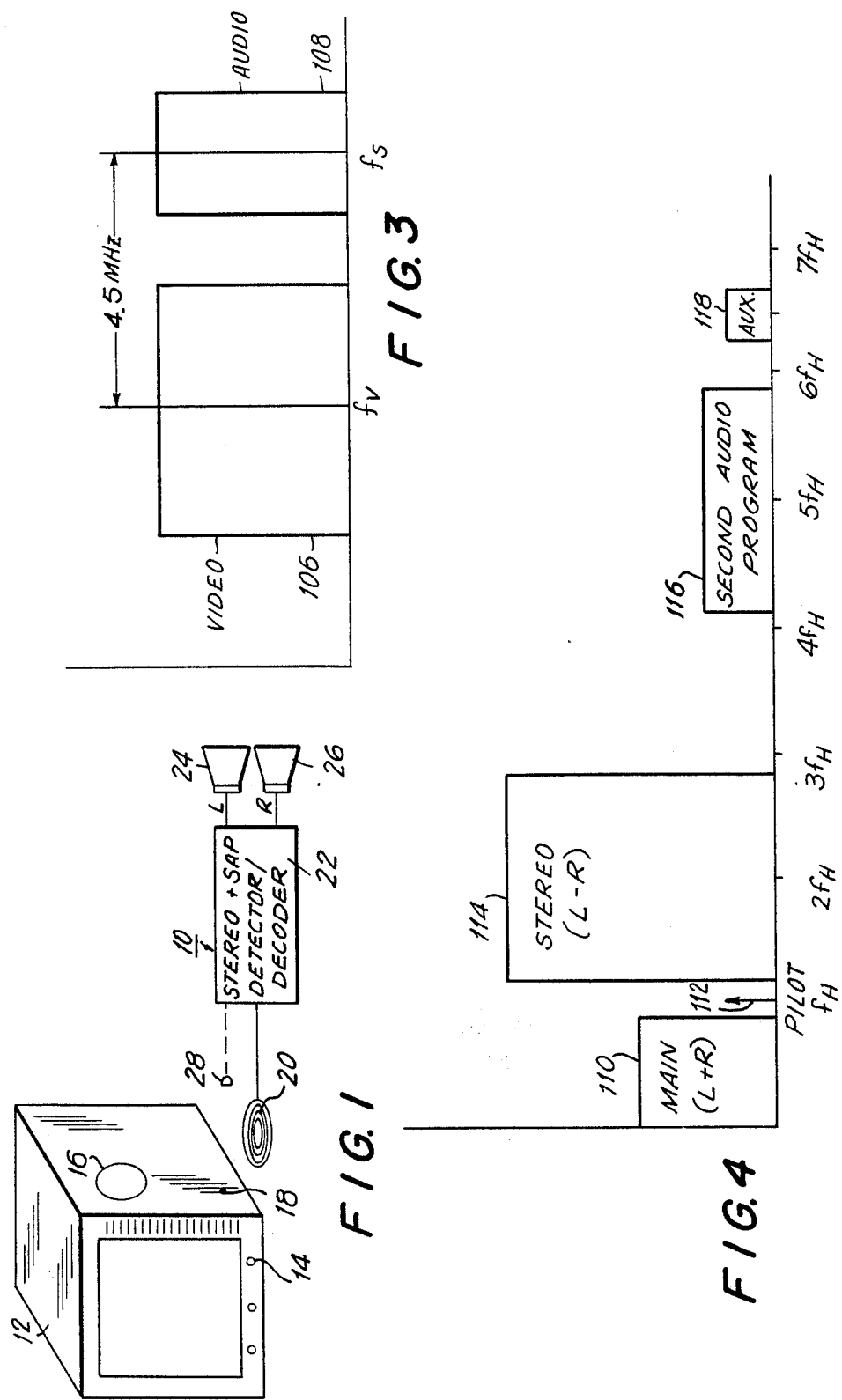
FIG. 1 is a schematic/block representation of the manner in which the present invention is used.

Referring now to the drawings, and in particular to FIG. 1, a representation of one manner in which adapter 10 of the present invention is used with a conventional television receiver 12 is depicted. The television receiver is assumed, for the purpose of the present description, to be of the type which does not include stereo, SAP or auxiliary channel detecting/decoding circuitry and, thus, is a television receiver with which the present invention finds ready application. It will, nevertheless, be appreciated that even if television receiver 12 includes a stereo detector/decoder, adapter 10 may be utilized therewith.

The illustrated television receiver includes a cabinet in which the usual circuitry, television picture tube, loudspeakers, manual selectors and manual controls are housed. As depicted, the manual selectors may comprise conventional channel selecting push-buttons; although the rotary turret-type channel selector may be provided. Television receiver 12 also includes a sound volume adjustment 14 which, as is conventional, is operated by the user to increase or decrease the volume of sound emanating from loudspeaker 16. It is expected that other controls, such as picture brightness, picture contrast and color controls, are included in television receiver 12. In addition, a headphone jack 18 may be provided in the cabinet, this headphone jack being conventional and connectable to a headphone plug to enable the user to listen to the audio portion of broadcasted television programs without disturbing others. If this headphone jack is provided, it is appreciated that sound volume adjustment 14 operates to adjust the sound level of the audio signals reproduced from the headphone jack.

Adapter 10 includes, broadly, an IF probe 20 and a stereo and SAP detector/decoder 22, the latter operating in conjunction with the IF probe to produce left-channel (L) and right-channel (R) audio signals. Detector/decoder 22 also may include circuitry to recover auxiliary channel signals that may be broadcasted or otherwise transmitted to television receiver 12, and is coupled to a pair of loudspeakers 24 and 26 for reproducing left-channel and right-channel audible sounds. Other utilization means may be used in place of the loudspeakers to recover data that may be transmitted on the auxiliary channel. For example, a suitable display device or a suitable recorder may be used. As an optional feature, a microphone 28 may be connected to detector/decoder 22 for supplying thereto electrical signals representing the output sound level emanating from loudspeaker 16. As an alternative, microphone 28 may be replaced by a suitable plug that mates with headphone jack 18. The purpose of supplying detector/decoder 22 with signals representing the output sound level of television receiver 12 will be discussed below.

In both conventional audio transmissions and stereo transmissions that accompany television broadcasting, the audio signals are modulated onto an audio carrier that is separate from the carrier onto which the video signals are modulated. As used herein, the expression "composite television signals" means both the video and audio signals which are transmitted by a television broadcaster for reception at various ones of television receivers. The expression "stereo audio signals" means the monophonic and stereophonic components (L+R) and (L−R) that normally comprise stereo signals, plus SAP signals, plus auxiliary channel signals if present. The frequency $f_s$ of the audio carrier is 4.5 MHz greater than the frequency $f_v$ of the video carrier. This frequency difference of 4.5 MHz remains substantially constant even though different carriers are used for different television channels. Some of these frequencies are as follows:

| Channel | $f_v$ MHz | $f_s$ MHz |
|---|---|---|
| 2 | 55.25 | 59.75 |
| 4 | 67.25 | 71.75 |
| 5 | 77.25 | 81.75 |
| 7 | 175.25 | 179.75 |
| 9 | 187.25 | 191.75 |
| 11 | 199.25 | 203.75 |
| 13 | 211.25 | 215.75 |

It is seen, therefore, that although the video and audio carriers $f_v$ and $f_s$ vary from one channel to the next, the audio carrier for each channel remains 4.5 MHz greater than the video carrier.

Television receiver 12 includes the usual IF section which, as is known, converts the different video carriers $f_v$ to a common video IF carrier whose frequency is 45.75 MHz, and converts the various audio carriers $f_s$ to a common audio IF carrier of frequency 41.25 MHz. Of course, the video IF carrier contains the various video components modulated thereon and the audio IF carrier contains the audio signals modulated thereon. Since the video and audio IF carriers remain separated by the aforementioned 4.5 MHz, simple filtering may be used to separate the video and audio information and to process and reproduce that information independently. As is also conventional, the IF section of television receiver 12 further converts the audio IF carrier to 4.5 MHz and generates leakage audio IF signals. Such leakage, or spurious, IF audio signals are detected by IF probe 20 which, as will be described below, is tuned to the audio IF carrier frequency of 4.5 MHz. In the preferred embodiment, the IF probe is an inductive probe comprised of a tuned transformer. It is contemplated, however, that other devices may be used, such as a capacitive pick-up probe.

An advantageous feature of utilizing IF probe 20 is the omission of any physical or electrical connections between that probe and the internal circuitry of television receiver 12. The signal strength of the leakage, or spurious, IF audio signals normally generated by the IF section of the television receiver is sufficient to be detected and to induce within probe 20 the flow of IF audio signals. Probe 20 merely need be placed on, around or under the cabinet of television receiver 12. Preferably the probe should be located proximate the physical position of the IF section of the television receiver. If accessible, therefore, probe 20 can be positioned within the cabinet at that location. Satisfactory results are obtained, nevertheless, by disposing probe 20 externally of the cabinet. As an example, the probe may comprise a suitable inductance pick-up, such as a cup core having a transformer wound thereon, the probe assembly being secured to a suction cup or other means by which the probe may be mounted or otherwise adhered to the cabinet of television receiver 12.

In operation, the IF audio signals induced in probe 20 are supplied to detector/decoder 22 whereat the IF audio signal is demodulated, and the presence of a stereophonic component is detected and decoded into separate left-channel and right-channel signals which, for convenience, are identified hereinafter as the L and R signals. In addition, the presence of an SAP signal is detected, as described below. Although not shown herein, detector/decoder 22 also may detect and recover whatever auxiliary channel signals are present in the induced IF audio signals. In the event that the transmitted audio signals which accompany the program to which television receiver 12 is tuned merely are monophonic signals and, thus, do not include a stereophonic component, detector/decoder 22 may produce simulated left and right channel signals, such simulated signals being referred to hereinafter as L' and R' signals. As will be described, simulated L' and R' signals may be produced in response to detected SAP signals.

Thus, even if television receiver 12 is not equipped to detect and decode transmitted stereo audio signals, adapter 10 may be used therewith to recover such signals. Adapter 10 provides the further advantage of producing simulated L' and R' signals even if the transmitted audio signals (or transmitted SAP signals) merely are monophonic signals.

Optionally connected microphone 28 (or the headphone plug) is used to control the output level of the L and R (or L' and R') signals produced by adapter 10. Typically, sound volume adjustment 14 of television receiver 12 is operated to increase or decrease the gain of the audio amplifier which drives loudspeaker 16. This gain adjustment usually is set manually and is not varied as a function of the magnitude of the demodulated audio signal. Since the user of television receiver 12 will be accustomed to adjusting the sound output level thereof by means of this sound volume adjustment, it is preferable that adapter 10 not be provided with its own independent volume adjustment. Rather, the audible volume emanating from loudspeakers 24 and 26 preferably should be established by the user's operation of sound volume adjustment 14. Microphone 28 operates to sense the output sound level generated by loudspeaker 16 and set the gain of the L and R (or L' and R') signals produced by detector/decoder 22 as a function of that sensed output sound level. Hence, if the user has established a relatively low volume output level, the L and R signals are subjected to a relatively lower gain. Conversely, if the user has established a higher output volume, the L and R signals are subjected to a relatively higher gain. Microphone 28 may be disposed in a housing separate and apart from IF probe 20 or, alternatively, both devices may be provided in a common housing. As a further alternative, the output sound level to which television receiver 12 has been set by sound volume adjustment 14 may be sensed by connecting a plug to headphone jack 18, thus replacing microphone 28 with that plug.

Notwithstanding the optional use of a microphone, plug or other means to sense the output sound level of television receiver 12, adapter 10 may be provided with a manually adjustable sound level control, if desired.

Figure 2:
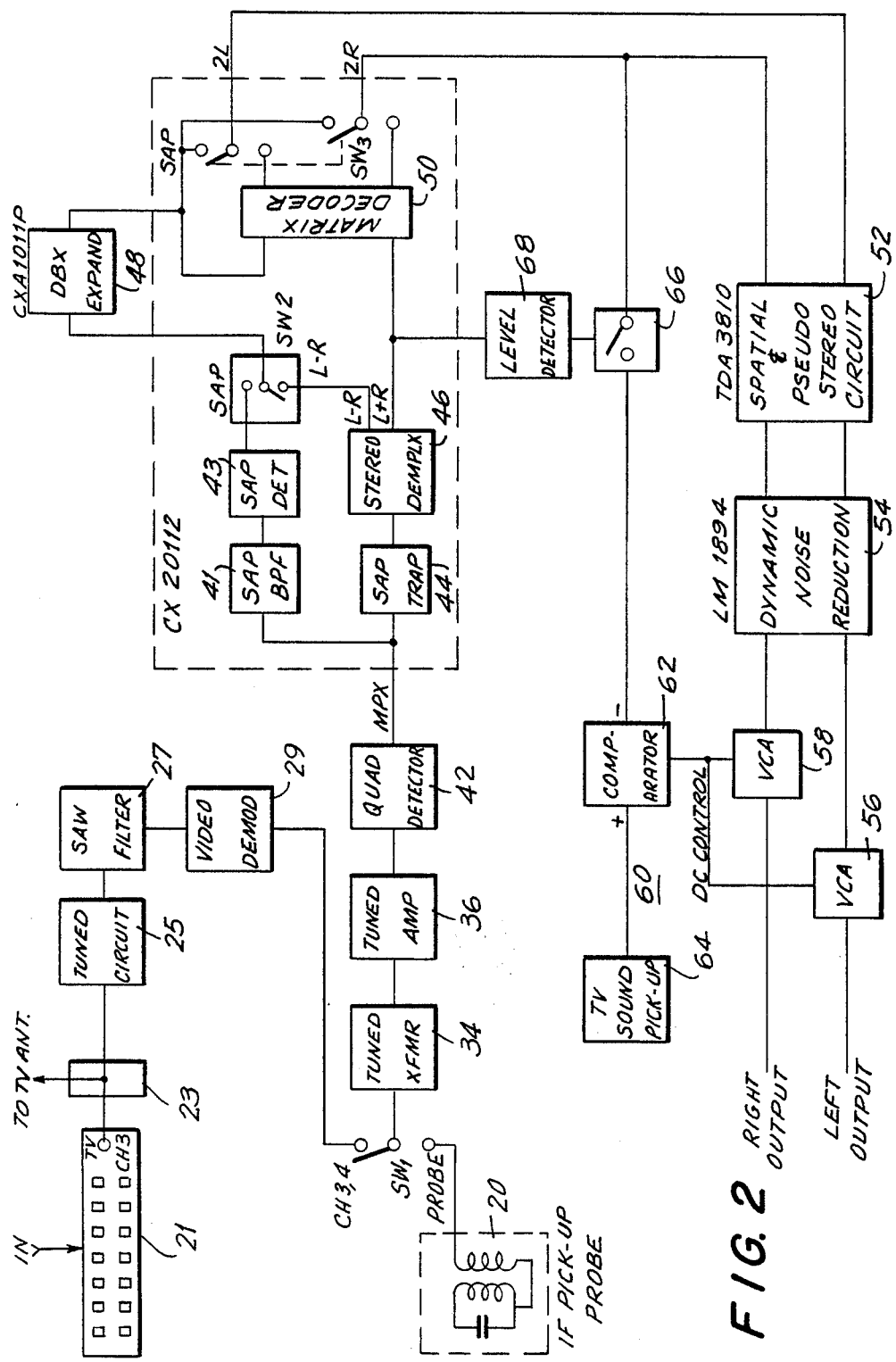
FIG. 2 is a block diagram of a preferred embodiment of this invention.

Turning now to FIG. 2, there is illustrated a block diagram of a preferred embodiment of adapter 10. The adapter, as illustrated in greater detail herein, is comprised of IF probe 20, a stereo detector 42, a stereo decoder 50, noise reduction circuitry 48 and 54, and output terminals for supplying decoded L and R signals to, for example, loudspeakers or other suitable utilization means. IF probe 20 is comprised of a tuned transformer whose resonant frequency is tuned to the audio IF frequency of, for example, 4.5 MHz. A tuned transformer 34 is coupled to IF probe 20 by a manual selector switch $SW_1$ (for a purpose soon to be described) and a tuned amplifier 36 is coupled to this tuned transformer. The combination of the tuned probe transformer, tuned transformer 34 and tuned amplifier 36 effectively eliminates extraneous signals from the IF audio signal.

Stereo detector 42 is adapted to detect the usual monophonic component and the stereophonic component, if the latter is transmitted, from the IF audio signal, and also is adapted to pass the SAP signal. Using conventional notation, the monophonic component is identified as the (L+R) component and the stereophonic component is identified as the (L−R) component. The monophonic and stereophonic components are frequency modulated onto the audio IF carrier and, in accordance with the Zenith system mentioned above, the IF audio carrier also is frequency modulated with a pilot signal of frequency $f_H$ (the horizontal synchronizing frequency), with the second audio program (modulated onto a subcarrier of frequency $5 f_H$) and with the auxiliary channel modulated onto a subcarrier of frequency $6.5 f_H$. The spectrum of the audio signals in the Zenith system is illustrated in FIG. 4. The purpose of detector 42 is to separate the monophonic (L+R) and stereophonic (L−R) components, and also the second audio program (SAP) signals and the auxiliary channel. As illustrated in FIG. 2, stereo detector 42 may be a quadrature detector, and this quadrature detector is coupled to an SAP trap 44 and to a stereo demultiplexer 46. All of these components are conventional and, thus, need not be described in detail herein.

If desired, a limiter, (not shown), may be coupled to tuned amplifier 36 to eliminate or at least minimize amplitude fluctuations in the frequency modulated audio IF signal. The quadrature detector, which, in turn, may be coupled to this limiter, functions in a manner known to those of ordinary skill in the frequency modulator/demodulator art to recover the monophonic (L+R) and stereophonic (L−R) components, as well as at least the SAP signal, from the frequency modulated IF audio signal. The quadrature detector includes means to recover the pilot signal and to utilize that pilot signal to detect the stereophonic component (L−R) which, as is conventional, is modulated onto a subcarrier of twice the pilot frequency, or $2 f_H$. Preferably, quadrature detector 42 also includes circuitry for recovering the second audio program and the auxiliary channel, each being modulated onto a separate subcarrier that is a multiple of the pilot frequency.

The output of quadrature detector 42 is coupled through SAP trap circuit 44 to stereo demultiplexer 46. The trap circuit may comprise, for example, a filter adapted to block the higher frequency components of the second audio program and auxiliary channel which are modulated onto higher frequency subcarriers. Stereo demultiplexer 46 thus is supplied with the monophonic and stereophonic components and serves to separate and supply these components to separate outputs, as illustrated. Stereo demultiplexer 46 thus may comprise a frequency demultiplexer which discriminates between the relatively lower frequencies occupied by the monophonic component (L+R) and the relatively higher frequencies occupied by the stereophonic component (L−R) which, as mentioned above (and shown in FIG. 4), is modulated onto a subcarrier that is twice the pilot frequency. The monophonic component (L+R) is coupled to stereo decoder 50 and the stereophonic component (L−R), is demodulated from its subcarrier and then is supplied to decoder 50 via a noise reduction expander 48.

Quadrature detector 42 also is coupled to an SAP detector 43 via an SAP bandpass filter 41. The bandpass filter should have a pass band capable of passing the SAP frequency spectrum shown in FIG. 4; and SAP detector 43 preferably comprises an FM demodulator for demodulating SAP information from its frequency-modulated carrier of, for example, $5f_H$.

The recovered stereophonic component (L−R) and the recovered SAP signals are selectively supplied to noise reduction circuit 48 by means of a selector switch $SW_2$. This selector switch is controlled by a control signal (not shown) supplied thereto from an external source, such as in response to the manual actuation of a pushbutton. This permits the user to operate adapter 10 to receive and recover either stereo audio signals or SAP signals. Alternatively, an SAP carrier detector may be coupled to bandpass filter 41 to detect the presence of the SAP carrier which, if detected, results in the actuation of switch $SW_2$ to couple SAP detector 43 to noise reduction circuit 48.

As mentioned above, the adapter of the present invention is compatible with the Zenith system of stereophonic TV transmission. Since the Zenith system employs noise reduction compression at the transmitter, noise reduction circuit 48 in the adapter of the present invention is compatible therewith. The noise reduction system utilized by the Zenith system has been developed by DBX Inc. of Waltham, Mass. Accordingly, noise reduction expander 48 comprises a dbx expander which is described in, for example, Audio Magazine, June 1984, pages 47-51. Expander 48 restores the stereophonic component (L−R) or the SAP signal, whichever is supplied by switch $SW_2$, to its original form (i. e. prior to its being subjected to noise reduction compression). One example of expander 48 is Model CXA1011P, manufactured by Sony Corporation.

Decoder 50 is coupled to expander 48 to receive the restored stereophonic component (L−R), and may comprise a conventional matrix decoder which, as is conventional, functions to sum the monophonic and stereophonic components and to subtract these components from each other. Decoder 50 thus produces respective channel-separated output signals identified in FIG. 2 as 2L and 2R. These decoded signals are supplied to a spatial/stereo/pseudo-stereo sound circuit 52 by a selector switch $SW_3$. This selector switch is schematically illustrated as a double pole, double throw switch, but preferably is formed as an electronic switch whose switching state is controlled by a control signal supplied from an external source. Switches $SW_2$ and $SW_3$ may be controlled by the same (or concurrently generated) control signal; and selector switch $SW_3$ is adapted to couple to circuit 52 the SAP signal restored by expander 48. It will be appreciated that, if the SAP signal is not subjected to noise compression at the transmitter, switch $SW_3$ may have one pair of its stationary contacts coupled directly to SAP detector 43 to couple the detected SAP signal to circuit 52. In this arrangement, switch $SW_2$ may be omitted. Nevertheless, in the embodiment illustrated in FIG. 2, selector switch $SW_3$ has one pair of stationary contacts coupled to the L and R outputs, respectively, of decoder 50 and a second pair of stationary contacts coupled in common to receive the restored SAP signal from noise reduction expander 48. Additionally, selector switch $SW_2$ has one stationary contact coupled to the (L−R) output of demultiplexer 46 and a second stationary contact coupled to SAP detector 43.

Circuit 52 preferably is a Model TDA 3810 circuit manufactured by Signetics Corporation of Sunnyvale, Calif. Although not shown in FIG. 2, circuit 52 operates in response to the actuation of selector pushbuttons connected thereto. One of these pushbuttons is designated the "stereo synthesizer" selector which, when actuated, closes a switch to utilize the signals supplied thereto by switch $SW_3$, such as the SAP signal or, alternatively, one of the signals produced by decoder 50, such as the left-channel output signal 2L, for the purpose of simulating two audio channels. It is appreciated that, in the absence of the stereophonic component (L−R), as when a stereophonic transmission is not present, decoder 50 supplies at its outputs two substantially similar signals. If switch $SW_3$ is not set to its SAP condition, these signals are supplied by the switch to circuit 52 which synthesizes left-channel and right-channel signals from one of those decoder output signals. Alternatively, if switch $SW_3$ is set to its SAP condition, the SAP signal is supplied to circuit 52 which synthesizes two channels therefrom. In the presence of the stereophonic component, the "stereo synthesizer" selector is disabled, and the output signals produced by decoder 50 may be coupled to circuit 52 where they merely are amplified. Another of the selector pushbuttons (not shown) is designated the "expander" selector which, when actuated, closes another switch (not shown) to increase the spatial separation effect of the left-channel and right-channel stereo signals. Further details of the construction and operation of circuit 52 are set out in literature published by Signetics Corporation in January 1984. Circuit 52 may be thought of as producing actual or simulated left-channel and right-channel output signals.

The respective output signals produced by circuit 52 are coupled to a conventional dynamic noise reduction circuit 54 which is adapted to provide, at its respective outputs, L and R signals. These outputs of noise reduction circuit 54 may be connected directly to output terminals or, as indicated in FIG. 2, may be connected to those output terminals by means of gain controlled amplifiers 56 and 58. It will be appreciated that, in accordance with the broader aspects of the present invention, such gain controlled amplifiers may be thought of as being optional.

Gain controlled amplifiers 56 and 58 are similar, and each preferably is comprised of a transconductance amplifier whose gain is set or adjusted by means of a DC gain controlled signal supplied thereto. The gain, or magnitude, of the L and R signals thus is adjusted or varied as a function of the DC gain control signal.

A gain control signal generator 60 is coupled to gain controlled amplifiers 56 and 58 to supply the aforementioned DC gain control signal thereto. Control signal generator 60 is comprised of a comparator 62 having one input connected to a sound pick-up 64 and another input connected to receive one of the output signals provided by switch $SW_3$. In the embodiment illustrated herein, either the restored SAP signal or the right-channel output signal 2R produced by decoder 50 is supplied to comparator 62. It will be appreciated, however, that the left-channel output signal 2L may be supplied by switch SW$_3$ to the comparator, if desired.

Sound pick-up 64 comprises microphone 28 (FIG. 1) or, alternatively, the plug which may be inserted into headphone jack 18 of television receiver 12. It is appreciated, therefore, that sound pick-up 64 supplies to comparator 62 a signal representing the output sound level of the television receiver. This signal varies not only as a function of the amplitude of the audio signal that is received by television receiver 12 but also as a function of the setting of sound volume adjustment 14.

Comparator 62 functions to compare the level of the signal representing the output sound level of the television receiver to the signal level supplied by switch SW$_3$. The difference between these compared signals controls the gain of gain controlled amplifiers 56 and 58. For the purpose of the present description, it is assumed that comparator 62 includes inverting and non-inverting inputs so as to produce a DC gain control signal that is a function of the difference between the signals supplied thereto. Sound pick-up 64 is illustrated as being coupled to the non-inverting input of comparator 62 and the output signal coupled by switch SW$_3$ is illustrated as being coupled to the inverting input of the comparator. As the difference between the signal representing the output sound level of the television receiver and the detected/decoded signal increases, the gain of the gain controlled amplifiers likewise increases. Conversely, as this difference decreases, the gain of amplifiers 56 and 58 is reduced. Comparator 60 preferably comprises a differential integrator, described in greater detail in U.S. parent application Ser. No. 758,042.

To prevent comparator 62 from inadvertently changing the DC gain control signal produced thereby during pauses or periods of silence in the audio signal transmitted to the television receiver, it is preferred that switch SW$_3$ be uncoupled from the comparator during such pauses or periods of silence. To this effect, a switch 66 couples switch SW$_3$ to comparator 62, switch 66 being "opened" and "closed" as a function of the signal level of the monophonic component (L+R) included in the broadcasted signal. As illustrated, the monophonic component produced by stereo demultiplexer 46 is coupled to a level detector 68 which senses when this monophonic component is above or below a predetermined threshold. When the monophonic component (L+R) is below that threshold, level detector 68 supplies a signal to switch 66 to effect the "opening" of that switch, thereby decoupling switch SW$_3$ from comparator 62. Conversely, when the monophonic component (L+R) exceeds the aforementioned threshold level, switch 66 is "closed" to couple switch SW$_3$ to the comparator. If desired, level detector 68 may be responsive to the SAP signal, if present, as by coupling the level detector to SAP detector 43 by a suitable selector switch.

In the preferred embodiment of the present invention, trap circuit 44, demultiplexer 46 and decoder 50, as well as filter 41, SAP detector 43 and selector switches SW$_2$ and SW$_3$ are included in an integrated circuit, as represented by the broken line in FIG. 2. One example of a satisfactory integrated circuit is Model CX20112 manufactured by Sony Corporation.

The present invention is readily applicable for use with so-called "pay TV" receivers. Typically, subscribers to a pay television distribution system, such as cable television subscribers or "scrambled" radio wave transcribers, are provided with a receiver/converter, also known as a "receiver box". One example of such a receiver/converter is illustrated in FIG. 2 as receiver box 21. As is conventional, scrambled television picture signals are supplied to receiver box 21, converted to conventional television signals, and coupled to the user's television receiver by, for example, coaxial cable connected to a TV output jack. Depending upon the particular location of receiver box 21, the video carrier frequency $f_v$ of the converted television signals is equal to 61.25 MHz (the carrier of "channel 3") or 67.25 MHz (the carrier of "channel 4"). For proper reception of such "pay TV" signals, the user's television receiver must be set (or tuned) to channel 3 or channel 4. Of course, receiver box 21 is provided with suitable tuning circuitry to select a desired one of several transmitted programs; and the selected program is converted to the aforementioned channel 3 or channel 4 carrier frequency. Hence, the user's television receiver remains tuned to channel 3 or channel 4 to reproduce the selected program.

In the embodiment illustrated in FIG. 2, the channel 3/4 output of receiver box 21 is coupled to a signal splitter 23 which "splits" the converted television signals to two paths: one to the usual antenna terminals of the user's television receiver; and the other to an input circuit comprised of a tuned circuit 25, a filter 27 and a video demodulator 29. Tuned circuit 25 is tuned to the video carrier frequency $f_v$ of the converted television signals supplied by receiver box 21 (i. e. it is tuned to channel 3 or to channel 4). The output of the tuned circuit is coupled to demodulator 29 by filter 27. The demodulator may be of conventional design and serves to separate the audio IF signal from the video IF signal. Thus, the 4.5 MHz audio If signal normally produced by the audio IF section of the conventional television receiver is produced by video demodulator 29. The video demodulator is coupled to selector switch SW$_1$ thereby supplying the same IF audio signals that otherwise would be supplied by IF pick-up probe 20. Thus, it is appreciated that the input circuit comprised of tuned circuit 25, filter 27 and demodulator 29 supplies the If audio signals to the coupling circuit comprised of tuned transformer 34 and tuned amplifier 36. Selector switch SW$_1$ connects this coupling circuit either to the input circuit 25, 27, 29 or to the input circuit comprised of pick-up probe 20, as may be desired by the user.

The manner in which the adapter illustrated in FIG. 2 operates now will be briefly described. IF probe 20 picks up the audio IF signal that is produced as a leakage signal by the usual IF section included in television receiver 12. Alternatively, if receiver box 21 is used, tuned circuit 25, filter 27 and demodulator 29 produce this audio IF signal. By reason of tuned transformer 34 and tuned amplifier 36, the IF signal supplied by switch SW$_1$ is suitably amplified and also is isolated from most electrical noise. The IF audio signal supplied to stereo detector 42 is comprised of a 4.5 MHz carrier that is frequency modulated with the monophonic component (L+R), the stereophonic component (L−R) which, in turn, is modulated onto a subcarrier whose frequency is twice the frequency of the pilot signal, the pilot signal itself, a second audio program which is modulated onto a subcarrier whose frequency is five times the frequency of the pilot signal, and an auxiliary channel that is modulated onto yet another subcarrier whose frequency is 6.5 times the frequency of the pilot signal. The SAP signal is selected and detected by SAP filter 41 and SAP detector 43. The auxiliary channel may be detected by other suitable circuitry (not shown), and demultiplexer 46 functions to demultiplex the monophonic and stereophonic components.

If switches $SW_2$ and $SW_3$ are set in their "stereo" conditions, the detected stereophonic component $(L-R)$ is subjected to noise reduction expansion compatible with the noise reduction compression to which it had been subjected at the transmitter. Thus returned to its original form, the stereophonic component $(L-R)$ is supplied to decoder 50 along with the detected monophonic component $(L+R)$. As is conventional, decoder 50 decodes the left-channel and right-channel signals from the monophonic and stereophonic components supplied thereto, and these decoded signals are supplied by switch $SW_3$ to spatial/stereo/pseudo-stereo circuit 52. Circuit 52 may be omitted, if desired. In the event that a stereophonic transmission has been received, actual L and R output signals are provided at the outputs of circuit 52. However, if a stereophonic transmission is not present, circuit 52 produces simulated L' and R' output signals.

If selector switches $SW_2$ and $SW_3$ are set to their SAP condition, the SAP signal detected by SAP detector 43 is coupled to expander 48 and the restored SAP signal is supplied to circuit 52. In the event that circuit 52 is omitted, the SAP signal may be supplied to noise reduction circuit 54; and if this circuit also is omitted, the SAP signal is supplied to amplifiers 56 and 58.

The output signals provided by circuit 52 are subjected to dynamic noise reduction and then the gains of these signals are adjusted accordingly by gain controlled amplifiers 56 and 58.

Gain controlled amplifiers 56 and 58 respond to the DC gain control signals supplied thereto by gain control signal generator 60 so as to amplify the supplied audio signals as a function, at least in part, of the setting of sound volume adjustment 14 of the television receiver. During a pause or period of silence, the level of the demultiplexed monophonic component $(L+R)$ falls below the threshold level established by (or supplied to) level detector 68, thereby "opening" switch 66. This uncouples switch $SW_3$ from comparator 62. At the same time, it is expected that the output sound level of the television receiver is very low, and a correspondingly small (or zero) level signal is supplied to the non-inverting input of the comparator from sound pick-up 64. As a result, during such pauses or periods of silence, no change is imparted to the DC gain control signal supplied to the gain controlled amplifiers. Upon the next occurrence of an audio signal, the previously established gain of these amplifiers results in amplification of the audio signals corresponding to the setting of sound volume adjustment 14. Hence, there are no sudden increases in the audio output signal levels which would otherwise result in sudden loud sounds emanating from loudspeakers 24 and 26. Likewise, there is no undesired negative change in the DC gain control signal during such pauses or periods of silence which otherwise would result in very low level sounds emanating from loudspeakers 24 and 26 upon the succeeding presence of a transmitted audio signal.

It is appreciated that, if desired, television receiver 12 may be used with a so-called remote control device by which the user may adjust the sound level (among other parameters) from a remote location. Gain controlled amplifiers 56 and 58 together with gain control signal generator 60 are adapted to function in the manner described above to amplify the audio signals as a function, at least in part, of the setting of such a remote sound adjustment control device for that television receiver.

Although not shown in FIG. 2, it will be recognized that suitable detecting/decoding circuitry may be coupled to the output of detector 42 to recover the auxiliary channel information that might have been broadcasted with the composite television signals. This recovered information is supplied to a utilization device, such as a loudspeaker, a display, or the like, which permits perception of that information by the user.

FIG. 3 is a graphical representation of the video and audio spectra transmitted to the television receiver. The video bandwidth 106 is centered on the video carrier frequency $f_v$, and the video bandwidth contains the usual video signals, including the horizontal synchronizing signal, the video information signal, the chrominance information signal, and the like. The audio bandwidth 108 is seen to be centered on the audio carrier frequency $f_s$ which, in accordance with the convention adopted in the United States, is separated from the video frequency carrier by 4.5 MHz. The audio bandwidth 108 contains the audio signals that are transmitted from the broadcasting source, including the usual monophonic component and, if stereophonic audio transmissions are effected, the stereophonic component, as well as the second audio program and the auxiliary channel.

FIG. 4 is a graphical representation of the spectrum of those audio signals, prior to frequency modulation onto the audio carrier, normally transmitted in accordance with the Zenith system of stereo TV broadcasting. Thus, the graphical representation of the spectrum shown in FIG. 4 is the base band spectrum containing the monophonic component $(L+R)$ 110, the pilot signal 112 (of frequency $f_H$), the stereophonic component $(L-R)$ 114 which is modulated onto a subcarrier whose frequency is 2 $f_H$, the second audio program 116 which is modulated onto another subcarrier of frequency 5 $f_H$ and the auxiliary information spectrum 118 which is modulated onto yet another subcarrier of frequency 6.5 $f_H$. It will be appreciated that the spectrum illustrated in FIG. 4 is provided at the output of detector 42 (FIG. 2). It will be recognized that the spectrum illustrated in FIG. 4 is the typical frequency spectrum of the Zenith system.

While the present invention has been particularly shown and described with reference to a preferred embodiment, it will be readily apparent to those of ordinary skill in the art that various changes and modifications may be made without departing from the spirit and scope of the invention. For example, the use of gain controlled amplifiers 56 and 58, together with the gain control signal generator therefor may be omitted, if desired. Likewise, spatial/stereo/pseudo-stereo circuit 52 may be replaced by conventional amplifiers which merely amplify the left-channel and right-channel output signals provided by decoder 50 or the SAP signal derived from detector 43, as may be applied by switch $SW_3$. Other changes and optional omissions or substitutions are contemplated.

It is intended that the appended claims be interpreted as including the foregoing as well as other changes and modifications.

What is claimed is:

1. A TV SAP/auxiliary channel adapter for use with a television receiver to detect and decode SAP or auxiliary channel signals that are transmitted with composite television signals, said adapter comprising:
   input means physically separate from said television receiver for supplying IF audio signals derived from the transmitted composite television signals;
   SAP/auxiliary channel detecting means for detecting from said IF audio signals SAP or auxiliary channel signals that are transmitted with said composite television signals;
   coupling means tuned to the IF carrier frequency of the supplied IF audio signals and connected between said input means and said SAP/auxiliary channel detecting means for applying the supplied IF audio signals at said IF carrier frequency to said SAP/auxiliary channel detecting means; and
   output means for providing SAP or auxiliary channel signals to drive utilization means, such as sound transducing means.

2. The adapter of claim 1 wherein said input means comprises a pick-up probe positionable in the vicinity of the IF stage normally provided in said television receiver to pick up spurious IF audio signals normally generated by said IF stage.

3. The adapter of claim 2 wherein said pick-up probe comprises an inductive probe tuned to said audio IF frequency for inducing the flow therein of IF audio signals.

4. The adapter of claim 1 wherein said input means comprises connection means for connection to a cable television receiver/converter which normally is connected to a television receiver; and demodulator means coupled to said connection means for receiving a composite television signal therefrom and for generating said IF audio signals from said composite television signal.

5. The adapter of claim 1 wherein at least the transmitted SAP signals are subjected to noise reduction compression prior to transmission, and wherein said output means includes noise reduction expansion means for subjecting the detected SAP signals to noise reduction expansion that is compatible with said noise reduction compression.

6. A TV stereo/SAP adapter for use with a television receiver to selectively detect and decode stereophonic audio signals or SAP signals that are transmitted with composite television signals, said adapter comprising:
   input means physically separate from said television receiver for supplying IF audio signals derived from the transmitted composite television signals;
   stereo detecting means for detecting from said IF audio signals monophonic and stereophonic components that are transmitted with said composite television signals;
   SAP detecting means for detecting from said IF audio signals SAP signals that are transmitted with said composite television signals;
   coupling means tuned to the IF carrier frequency of the supplied IF audio signals and connected between said input means and both said stereo detecting means and said SAP detecting means for applying the supplied IF audio signals at said IF carrier frequency to said stereo and SAP detecting means; and
   stereo decoding means responsive to the detected components for decoding left-channel and right-channel audio signals therefrom;
   output means for providing left-channel and right-channel signals or SAP signals to drive utilization means, such as sound transducing means; and
   switch means having a first state to cause the left-channel and right-channel audio signals to be applied to said output means, and a second state to cause the SAP signals to be applied to said output means.

7. The adapter of claim 6 wherein said input means comprises a pick-up probe positionable in the vicinity of the IF stage normally provided in said television receiver to pick up spurious IF audio signals normally generated by said IF stage.

8. The adapter of claim 7 wherein said pick-up probe comprises an inductive probe tuned to said audio IF frequency for inducing the flow therein of IF audio signals.

9. The adapter of claim 6 wherein said input means comprises connection means for connection to a cable television receiver/converter which normally is connected to a television receiver; and demodulator means coupled to said connection means for receiving a composite television signal therefrom and for generating said IF audio signals from said composite television signal.

10. The adapter of claim 6 wherein said input means comprises an input selector switch having first and second input terminals, said first input terminal being connectable to an inductive pick-up probe tuned to said audio IF frequency, and said second input terminal being connected to demodulator means which generates IF audio signals from a composite television signal and which is coupled by tuned circuit means to connection means for connection to a cable television receiver/converter for receiving therefrom said composite television signal.

11. The adapter of claim 10 wherein said tuned circuit means is tuned to the frequency of a preset television channel.

12. The adapter of claim 6 wherein the stereophonic component and the SAP signals that are transmitted with said composite television signal are subjected to noise reduction compression prior to transmission; and further comprising noise reduction expansion means for subjecting signals supplied thereto to noise reduction expansion that is compatible with said noise reduction compression, and selector switch means for selectively supplying said stereophonic component or said SAP signals to said noise reduction expansion means.

13. The adapter of claim 12 wherein the output of said noise reduction expansion means is coupled to said stereo decoding means and also to the first-mentioned switch means.

14. The adapter of claim 6 wherein said output means includes stereo/pseudo-stereo change-over means coupled to said switch means and selectively operative in a first mode to provide at its output the left-channel and right-channel audio signals supplied by said switch means from said stereo decoding means, and operative in a second mode to simulate from a single channel audio signal supplied by said said switch means from said stereo decoding means or from said SAP detecting means a second, simulated channel and to provide at its output the single channel and simulated channel audio signals.

15. The adapter of claim 6 wherein said output means includes automatic gain control means for controlling the gain of the left-channel and right-channel signals or the SAP signals which drive said utilization means; and generating means responsive, at least in part, to the output sound level of said television receiver to generate a gain controlling signal for said automatic gain control means.

16. The adapter of claim 15 wherein said generating means comprises a sound signal source for providing a signal representing said output sound level of said television receiver; and comparator means for comparing the sound-representing signal to one of said left-channel and right-channel audio signals or to said SAP signals for generating a gain controlling signal whose magnitude varies with the difference between the compared signals.

17. The adapter of claim 16 wherein said television receiver includes sound volume adjustment means for adjusting the level of the output sound level of the television receiver, whereby the magnitude of said gain controlling signal is a function of the setting of said sound volume adjustment means.

18. The adapter of claim 15 wherein said television receiver is provided with a headphone jack, and said sound signal source comprises a plug for connection with said headphone jack for coupling sound-representing signals normally provided at said headphone jack.

* * * * *